United States Patent [19]

Lauritzen et al.

[11] Patent Number: 5,441,705
[45] Date of Patent: Aug. 15, 1995

[54] COMBINED REACTION CAN AND INFLATOR WITH EXTRUDED GENERANT

[75] Inventors: Donald R. Lauritzen, Hyrum; David J. Green, Brigham City; Larry D. Rose, Layton, all of Utah

[73] Assignee: Morton International, Inc., Chicago, Ill.

[21] Appl. No.: 213,176

[22] Filed: Mar. 14, 1994

[51] Int. Cl.⁶ ............................................. B60R 21/26
[52] U.S. Cl. ................................ 422/166; 280/728.1
[58] Field of Search ................ 422/164, 165, 166, 167, 422/305; 280/728, 729, 730, 731, 732, 736, 741; 102/350, 351

[56] References Cited

U.S. PATENT DOCUMENTS

| | | | |
|---|---|---|---|
| 4,278,638 | 7/1981 | Nilsson et al. | 280/736 |
| 4,846,368 | 7/1989 | Goetz | 280/736 |
| 4,919,897 | 4/1990 | Bender et al. | 422/305 |
| 4,923,212 | 5/1990 | Cuevas | 280/736 |
| 5,078,422 | 1/1992 | Hamilton et al. | 280/736 |

*Primary Examiner*—Timothy M. McMahon
*Attorney, Agent, or Firm*—George W. Rauchfuss, Jr.; Gerald K. White

[57] ABSTRACT

The reaction canister for a passenger side airbag restraint system comprises a trough-like main body and a substantially cylindrical inflator housing which are extruded in one piece. The generant charge and igniter strips within the inflator housing are also extruded. The generant charge may be divided into active and inert segments to control the volume of gas produced upon ignition.

11 Claims, 3 Drawing Sheets

COMBINED REACTION CAN AND INFLATOR WITH EXTRUDED GENERANT

TECHNICAL FIELD

This invention relates to motor vehicle airbag restraint systems.

BACKGROUND ART

A motor vehicle airbag system, and in particular a passenger-side module, customarily includes a trough-shaped reaction canister closed at its ends by endplates. An inflator is mounted within the reaction canister. The inflator normally comprises a cylindrical ignition can having gas ports through its wall. The ignition can encloses a gas generant surrounded by a filtration medium. A folded airbag is enclosed within the reaction canister with its mouth arranged to receive the gases from the generant when activated by a crash sensor.

Most prior art inflators include generants that burn from the center outward. They might be, for example, in the form of stacked washer-like wafers having an igniter passing through the central hole. Alternatively, the generant might be in the form of pellets surrounding the igniter. Upon ignition, the gases which are produced exit through gaps between the wafers, through spaces around the pellets, or through gaps between generant sections. These arrangements have worked well in practice. However, the number of individual pieces, both of the generant and the reaction canister, have required expensive fabrication machinery and an undesirable amount of handling and assembly. As a result, the inflator has become the most expensive part of the airbag module. Accordingly it is a primary object of the present invention to provide an airbag module wherein the number of parts is substantially reduced. Another object is to substantially reduce the amount of labor required to assemble such a module. Other objects, features and advantages will become apparent from the following description and appended claims.

DISCLOSURE OF INVENTION

The trough-like main body of a reaction canister and an inflator housing are extruded in one piece. Both the generant charge and the igniter strips are also extruded. The main generant charge may extend the full length of the canister or may be assembled with one or more inert sections to control the volume of gas produced.

BEST MODE FOR CARRYING OUT HE INVENTION

Figure 1:
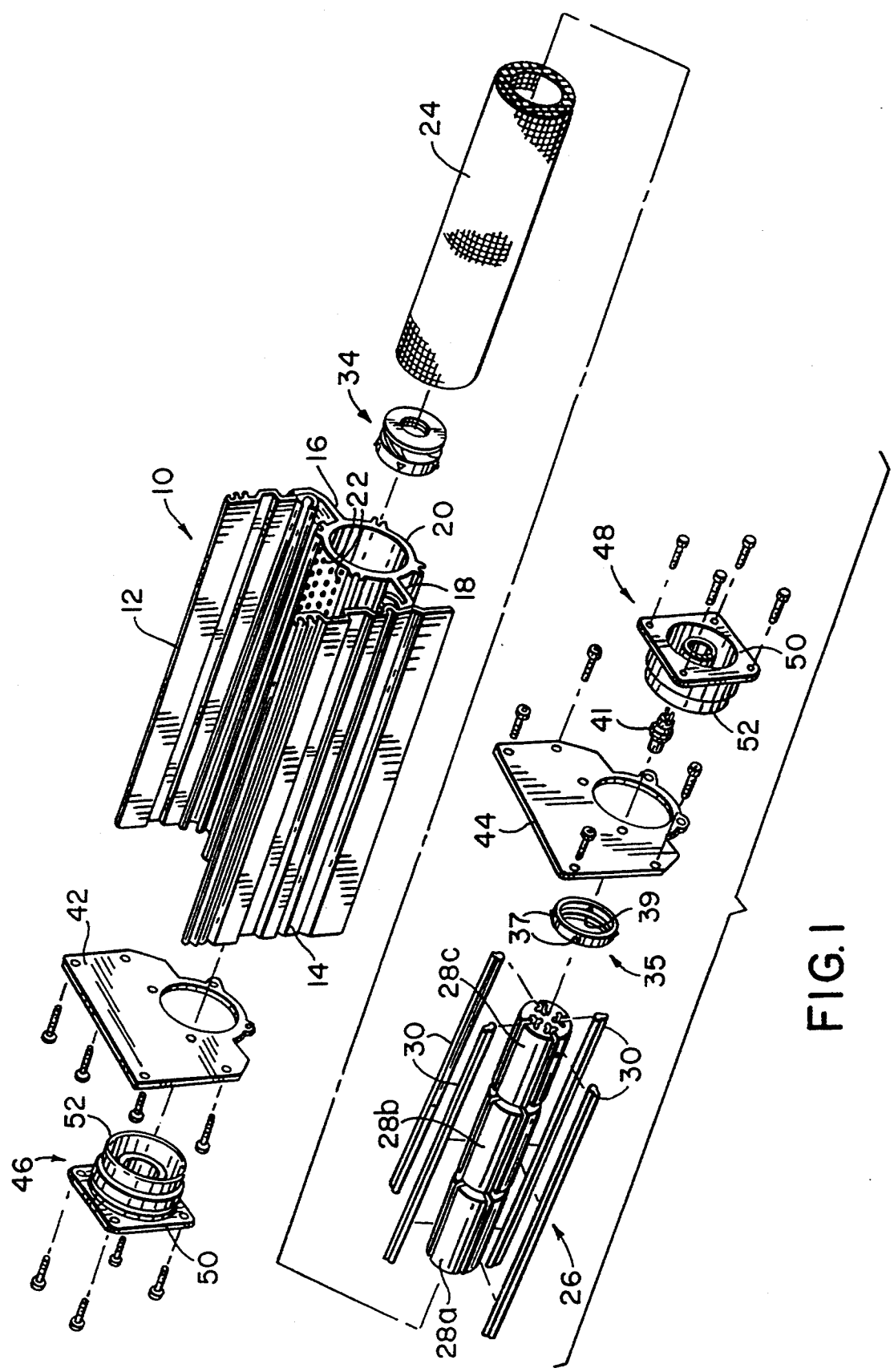
FIG. 1 is an exploded perspective view illustrating the various elements making up the airbag module of this invention.
Figure 2:
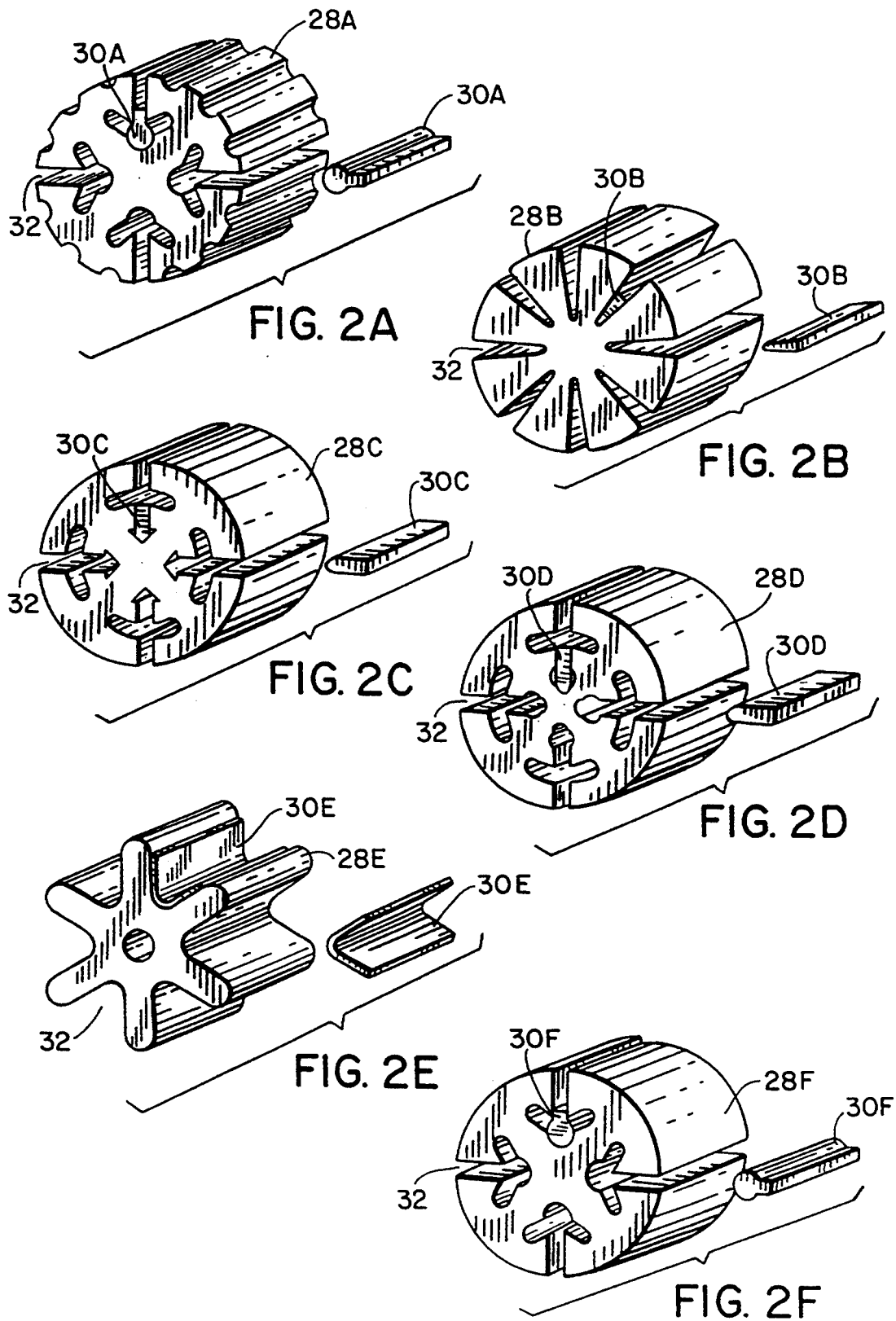
FIGS. 2A-2F illustrate various configurations of the extruded gas generant and igniter strips.
Figure 3:
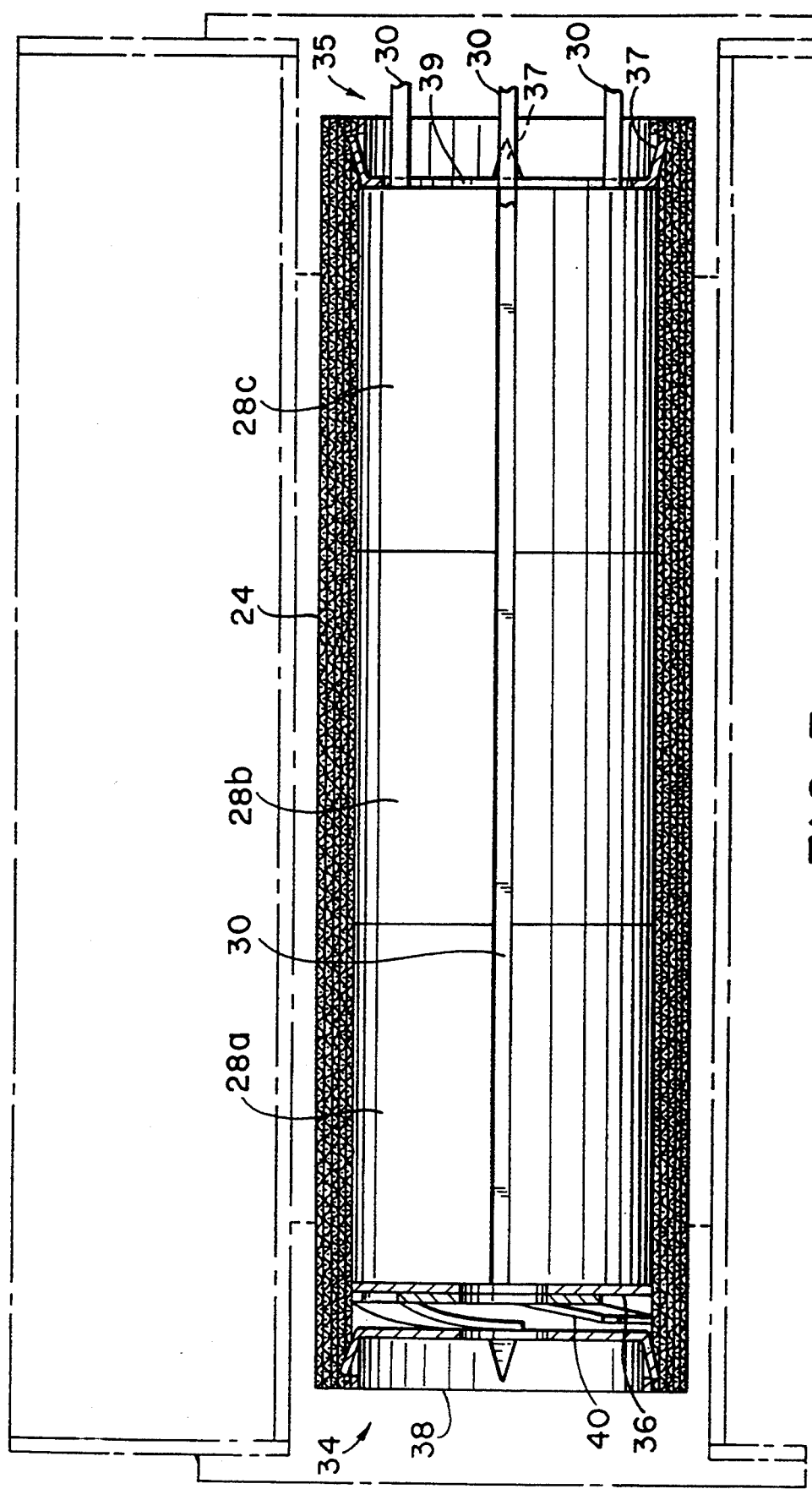
FIG. 3 is a longitudinal cross-section through the assembled structure.

FIG. 1 illustrates in exploded format the various elements which make up a passenger-side airbag module incorporating the present invention. The main body is a reaction canister 10 which includes sidewalls 12, 14 forming the sides of a trough. The floor of the trough is formed by inwardly extending extensions 16, 18 of the sidewalls. These sidewall extensions are integral with diametrically opposite sides of a cylindrical ignition can 20. It is important to note that all of the foregoing elements of the reaction canister 10 are joined in a single member which is preferably extruded and cut to the desired length. The material employed may be, for example, aluminum. The top surface of the ignition can 20 which lies within the trough is drilled or pierced to form a plurality of vent holes 22. The vent holes 22 permit gas from an activated generant within the ignition can 20 to enter the mouth of an airbag which is contained within the reaction can 10. As the airbag itself does not form a part of this invention, it is not illustrated.

Housed within the ignition can 20 is a hollow cylindrical filter 24 which may be formed, for example, of wire mesh. Enclosed within the cylindrical filter 24 is a gas generant assembly 26. The gas generant assembly comprises a cylindrical generant charge 28 which may be in one piece or in a plurality of pieces 28a, 28b, 28c as illustrated. Retained in cavities within the generant charge are a plurality of strip igniters 30. Both the generant charge 28 and the strip igniters 30 may be extruded.

The reason for illustrating the generant charge 28 as a plurality of extrusions is to illustrate a "tuned" charge. In such a charge, one section such as central portion 28b may be inert. As a result, the volume of gases produced is reduced without the need for changing the size of the reaction canister.

It is desirable for the generant charge to burn for a given period of time and then to burn out with little or no tail off. It is important, however, for the gases to move outwardly normal to the center of the charge, to the ports at the outer periphery of the ignition can 20. To accomplish these objectives a variety of grain configurations may be employed which permit gases to exit through the outer surfaces of the generant charge. These configurations can also control the production of burned gas, which is desirable during the initial phase of the burn. It is most desirable to obtain low gas production during the first 15 milliseconds of burn followed by maximum gas production to burnout. Various configurations of gas generant cross-sections and strip igniters are illustrated in FIGS. 2A-2F. In each instance, the generally cylindrical generant 28 defines radial openings 32 of various shapes into which are keyed the correspondingly shaped strip igniters 30.

The igniter strips 30 protrude past the generant charge 28 to surround an initiator 41. The protruding ends may be sensitized to aid ignition. The initiator 41 will ignite the protruding igniter strips which will, in turn, ignite the generant.

The generant charge 28 is preloaded to provide cushioning against shock, vibration and thermal expansion. It will also take up any tolerance differences. A preload assembly 34 is provided at one end of the generant charge 28. It may comprise for example a unitary flat washer 36 and cup 38 with a finger spring washer 40 in between. Such an assembly is described in detail in a co-pending application of D. R. Lauritzen and J. L. Ralston (attorney's docket no. 2338-21-00) filed concurrently herewith and assigned to the same assignee as the present invention. The disclosure of that application is incorporated herein by reference.

The opposite end of the generant charge 28 abuts a cup member 35 which includes barbs 37 which dig into the filter 24. The base of the cup member defines a central aperture 39 through which pass the ends of the strip igniters 30.

The reaction canister is completed by endplates 42, 44 at either end. End bases 46, 48 of the usual type have flat plates 50 which are screwed to the respective endplates and include cylindrical sockets 52 for receiving the ends of the gas generant assembly 26 and filter 24.

It is believed that the many advantages of this invention will now be apparent to those skilled in the art. It will also be apparent that a number of variations and modifications may be made therein without departing from its spirit and scope. Accordingly the foregoing description is to be construed as illustrative only rather than limiting. This invention is limited only by the scope of the following claims.

We claim:

1. In a vehicle occupant restraint system including a trough-shaped main body having first and second ends, first and second end plates attached to said main body to form a reaction canister, an ignition chamber in gas flow communication with the interior of said canister, a gas generant within said ignition chamber, said reaction canister being adapted to enclose an airbag to be filled with gas from said gas generant upon ignition, and means for igniting said gas generant, the improvement of which comprises:

said gas generant comprising an extruded, elongated substantially cylindrical member having an elongated length and a substantially circular cross-section partially subdivided by radial grooves extending along the length of said member and wherein igniter strips are retained within a plurality of said radial grooves.

2. The improvement of claim 1 wherein said main body and ignition chamber are extruded as a single member.

3. The improvement of claim 1 wherein said grooves extend radially inwardly from a radial surface of said member and terminate at a depth less than a radius of said circular cross-section.

4. The improvement according to claim 1 wherein said gas generant comprises a plurality of said extruded, elongated members and wherein said members comprise both active and inert members.

5. The improvement of claim 1 wherein each of said igniter strips has a cross-sectional shape substantially conforming to the shape of an associated groove in which it is retained.

6. The improvement of claim 5 wherein said igniter strips are extruded.

7. A gas generant for use in a vehicle occupant restraint system which comprises:

an extruded, member having an elongated length and a substantially circular cross section partially subdivided by radial grooves extending along said length; and igniter strips retained within a plurality of said radial grooves.

8. The gas generant of claim 7 wherein said grooves extend radially inwardly from a radial surface of said elongated member and terminate at a depth less than a radius of said circular cross-section.

9. A gas generant according to claim 7 wherein said gas generant comprises a plurality of said extruded, elongated members and wherein said members comprise both active and inert members.

10. The gas generant of claim 7 wherein each of said igniter strips has a cross-sectional shape substantially conforming to the shape of an associated groove in which it is retained.

11. The gas generant of claim 10 wherein said igniter strips are extruded.

* * * * *